(12) United States Patent
Formica

(10) Patent No.: US 9,468,871 B2
(45) Date of Patent: *Oct. 18, 2016

(54) LIQUID FILTER ASSEMBLY; COMPONENTS; AND, METHODS

(71) Applicant: Donaldson Company, Inc., Minneapolis, MN (US)

(72) Inventor: Claudio Formica, Pomponesco (IT)

(73) Assignee: Donaldson Company, Inc., Minneapolis, MN (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/157,788

(22) Filed: Jan. 17, 2014

(65) Prior Publication Data

US 2014/0305861 A1   Oct. 16, 2014

Related U.S. Application Data

(63) Continuation of application No. 13/470,455, filed on May 14, 2012, now Pat. No. 8,632,676, which is a continuation of application No. 12/310,468, filed as application No. PCT/US2007/018037 on Aug. 16, 2007, now Pat. No. 8,177,976.

(60) Provisional application No. 60/842,914, filed on Sep. 6, 2006.

(51) Int. Cl.
| | |
|---|---|
| *B01D 35/147* | (2006.01) |
| *B01D 29/21* | (2006.01) |
| *B01D 29/15* | (2006.01) |
| *B01D 35/027* | (2006.01) |

(52) U.S. Cl.
CPC .............. *B01D 29/15* (2013.01); *B01D 29/21* (2013.01); *B01D 35/0276* (2013.01); *B01D 35/147* (2013.01); *B01D 2201/0415* (2013.01); *B01D 2201/34* (2013.01); *B01D 2201/4046* (2013.01)

(58) Field of Classification Search
None
See application file for complete search history.

(56) References Cited

U.S. PATENT DOCUMENTS

| | | |
|---|---|---|
| 3,317,046 A | 5/1967 | Landree et al. |
| 3,344,923 A | 10/1967 | Silverwater et al. |
| 3,502,220 A | 3/1970 | Kohlberg |
| 4,124,511 A | 11/1978 | Lay |
| 4,133,763 A | 1/1979 | Cooper |
| 4,272,368 A | 6/1981 | Foord et al. |
| 5,334,309 A | 8/1994 | Huggett et al. |
| 6,217,755 B1 | 4/2001 | Stifelman et al. |

(Continued)

FOREIGN PATENT DOCUMENTS

| | | |
|---|---|---|
| GB | 1 604 832 | 12/1981 |
| JP | 11-247640 | 9/1999 |
| WO | WO 2005/063358 | 7/2005 |

OTHER PUBLICATIONS

PCT Search Report for PCT/US2007/018037 mailed Dec. 18, 2007.

(Continued)

*Primary Examiner* — Krishnan S Menon
(74) *Attorney, Agent, or Firm* — Merchant & Gould P.C.

(57) ABSTRACT

A liquid filter assembly is provided. The preferred assembly includes a serviceable filter cartridge having a primary filter section and a secondary or bypass filter section. The preferred assembly includes a bypass valve arrangement and a suction filter arrangement. An optional valve, to allow flow from an interior of the assembly to a reservoir if needed, is provided. Preferred serviceable filter cartridges are shown.

15 Claims, 15 Drawing Sheets

(56) References Cited

U.S. PATENT DOCUMENTS

| | | |
|---|---|---|
| 6,605,210 B2 | 8/2003 | Reinhardt |
| 6,685,829 B1 | 2/2004 | Baumann et al. |
| 6,733,666 B1 | 5/2004 | Wilkendorf et al. |
| 6,936,084 B2 | 8/2005 | Schlensker et al. |
| 8,177,976 B2 | 5/2012 | Formica |
| 8,404,029 B2 | 3/2013 | Lundgren et al. |
| 8,632,676 B2 | 1/2014 | Formica |
| 2005/0252848 A1 | 11/2005 | Miller |
| 2009/0057213 A1 | 3/2009 | Schiavon et al. |
| 2011/0017155 A1 | 1/2011 | Jacob |

OTHER PUBLICATIONS

U.S. Appl. No. 60/936,006, filed Jun. 14, 2007, Lundgren et al.
U.S. Appl. No. 60/962,993, filed Aug. 2, 2007, Jacob.
European Search Report (EP 1356524.4) mailed Oct. 1, 2013 (6 pages).

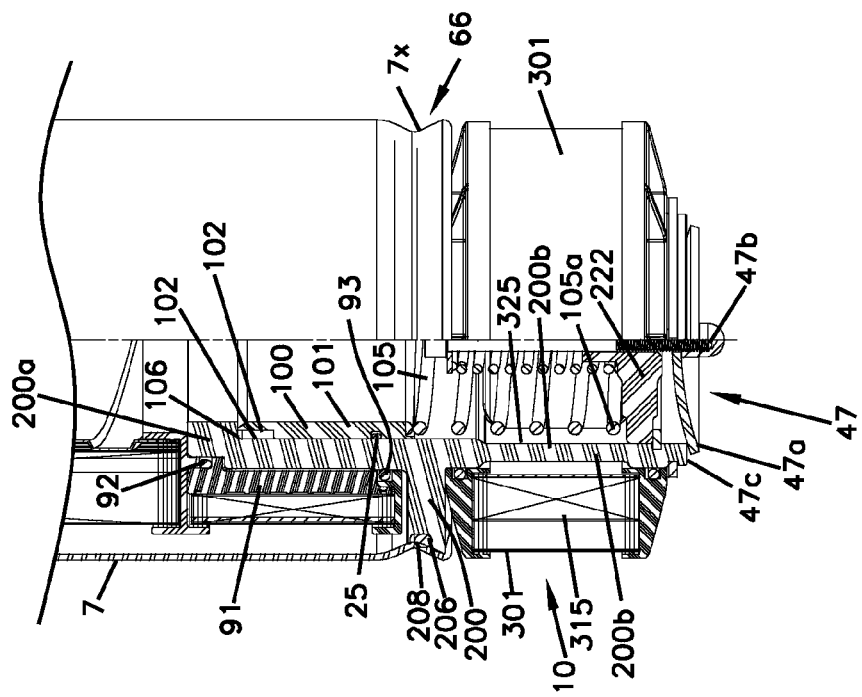
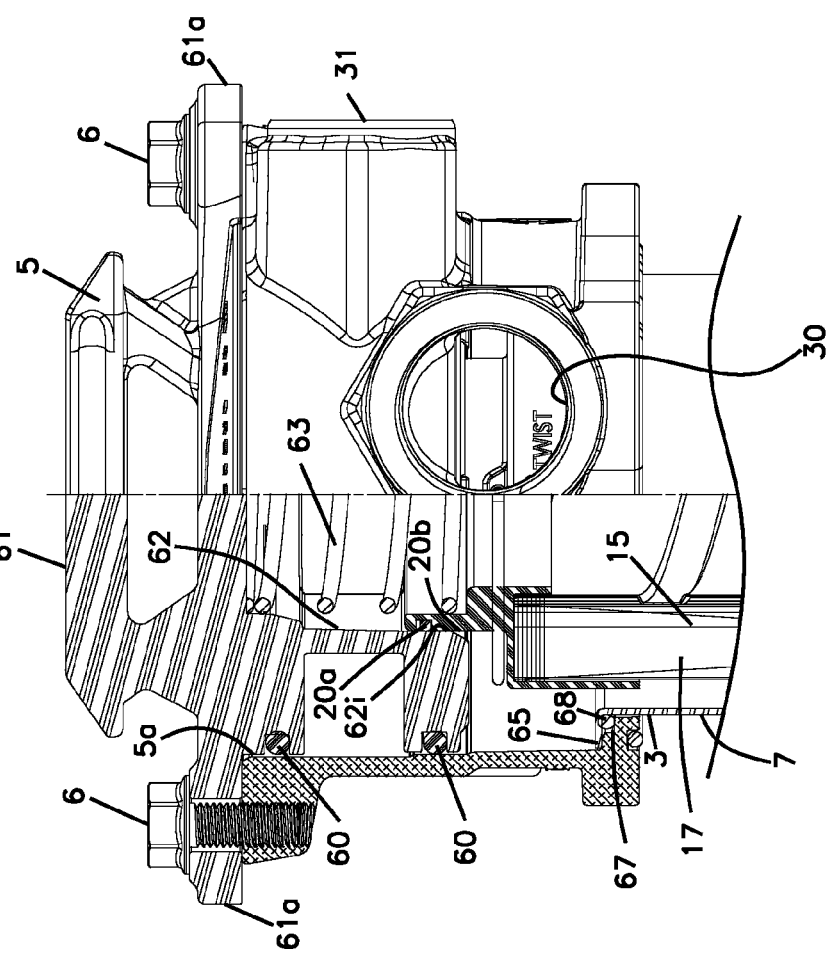

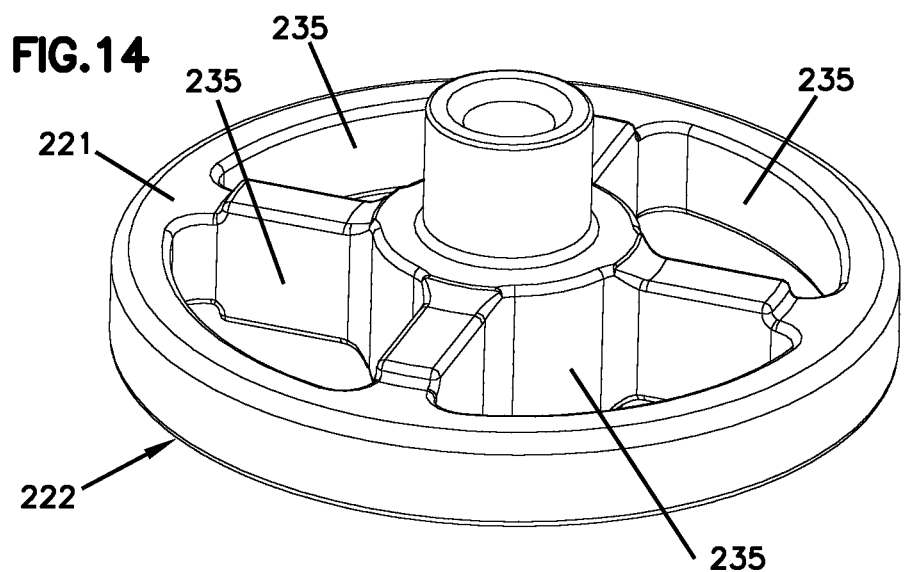
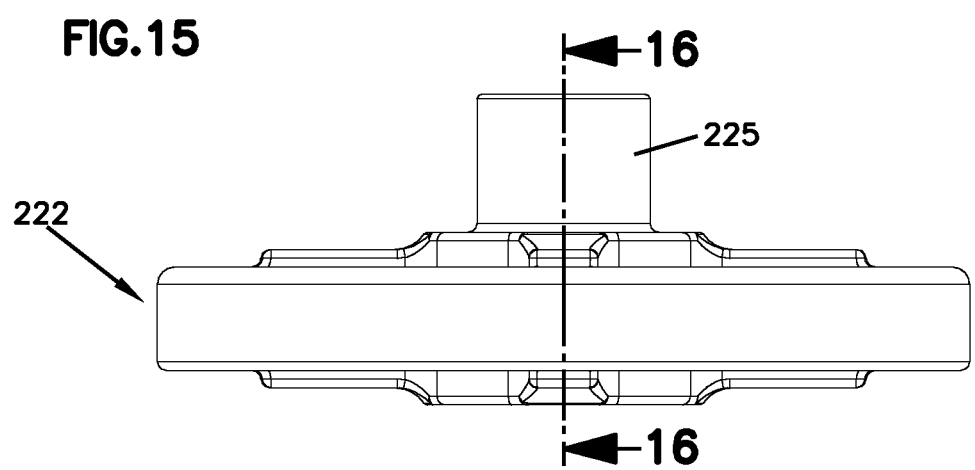
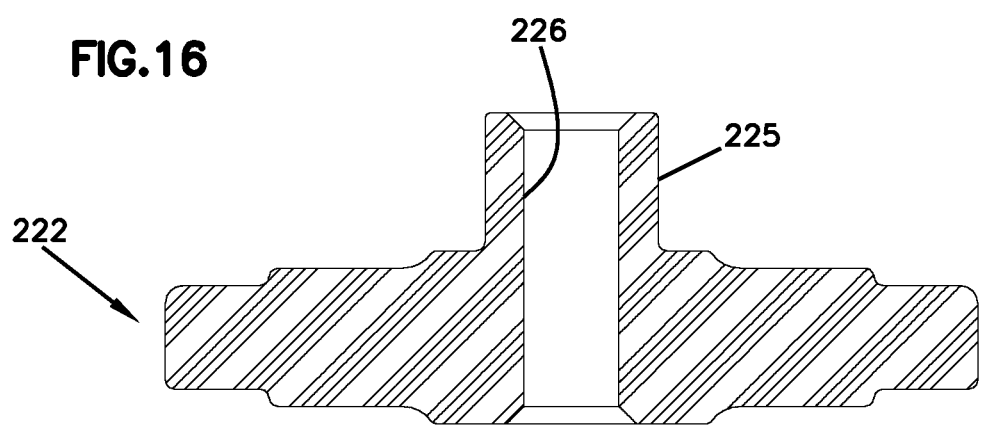

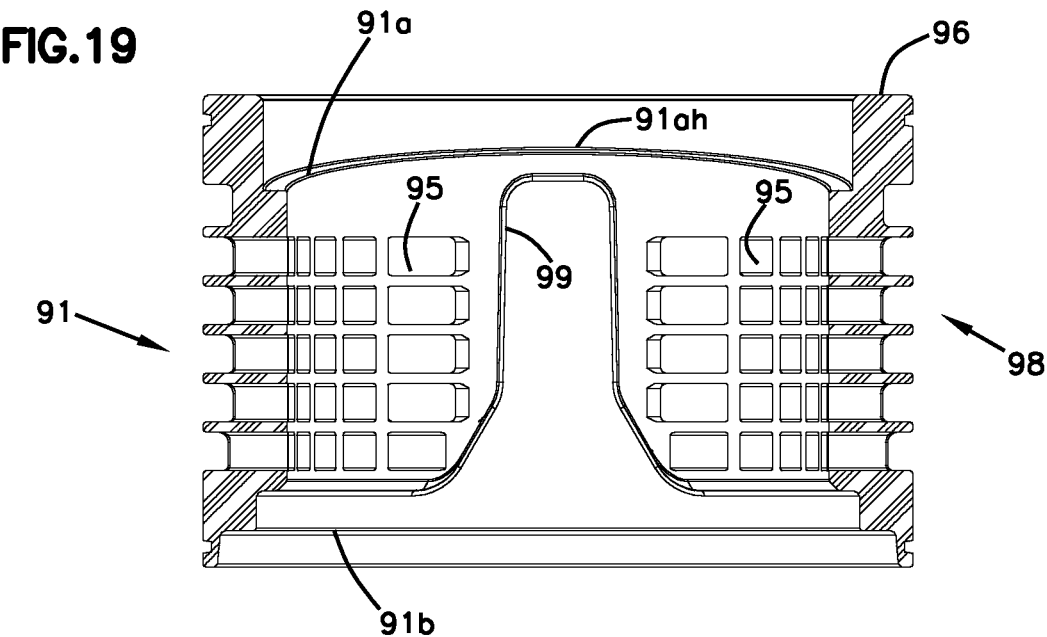
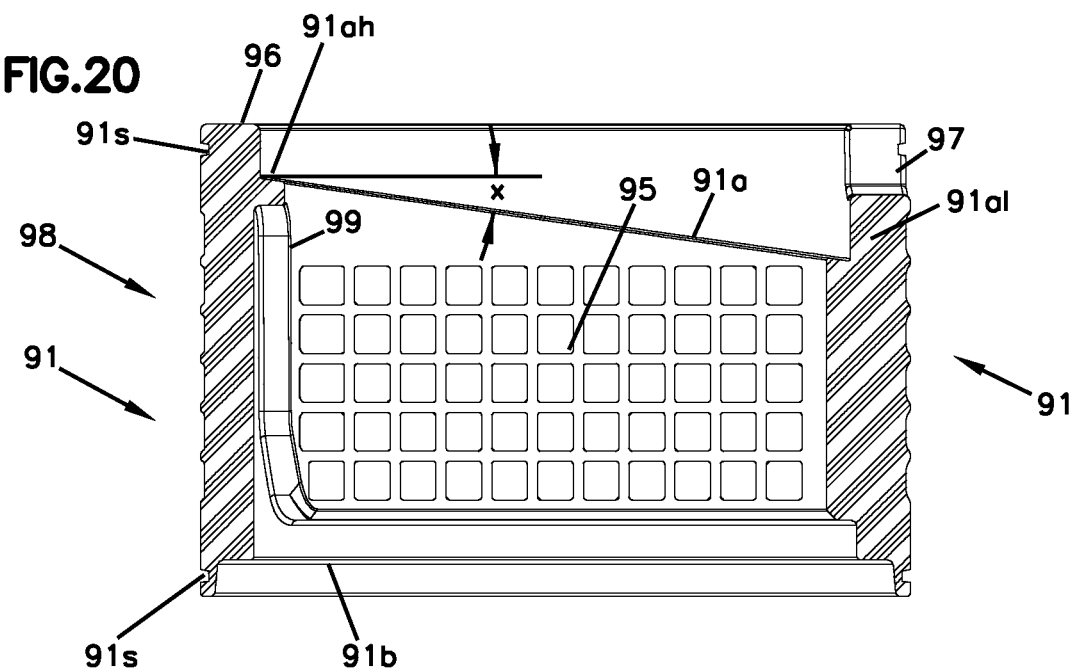

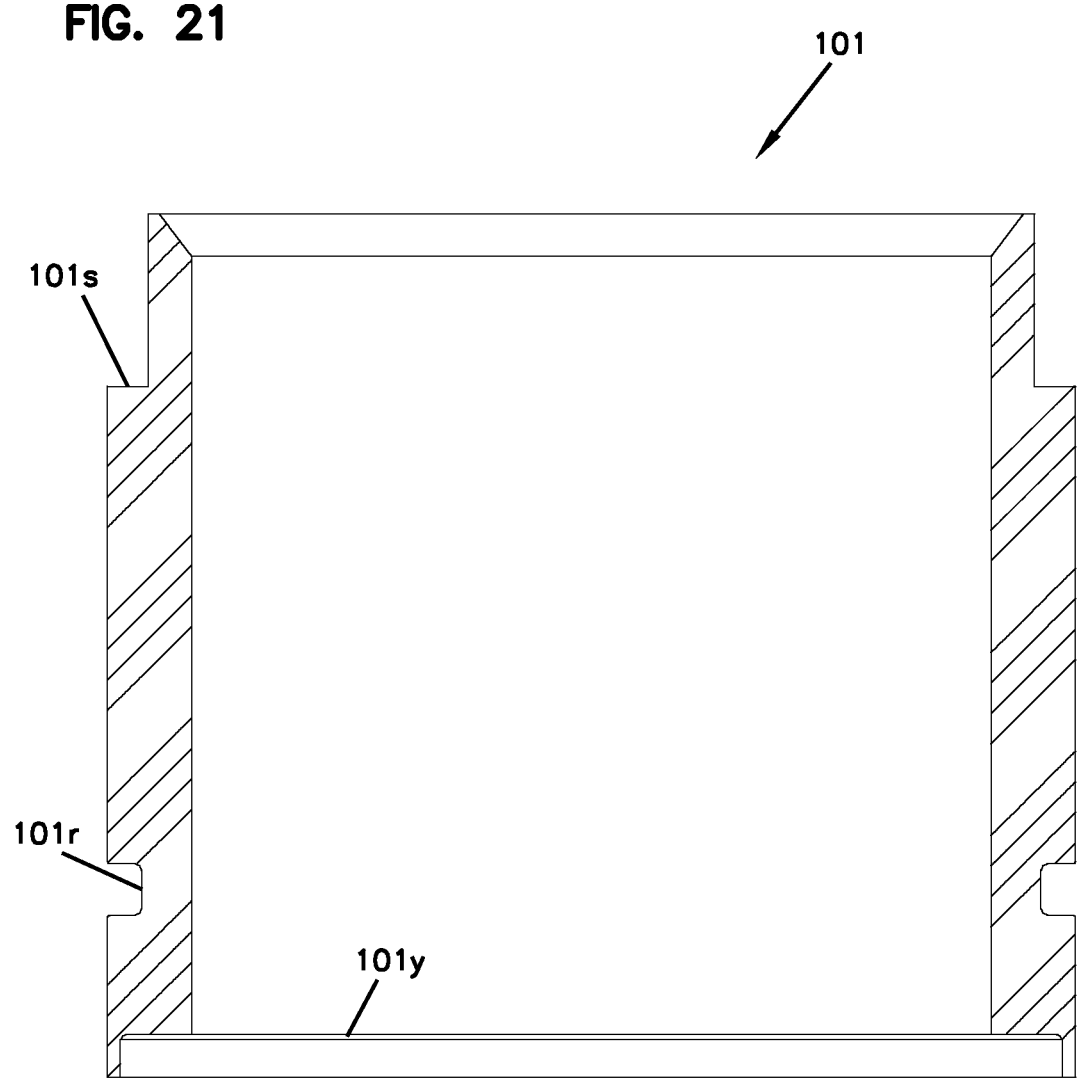

LIQUID FILTER ASSEMBLY; COMPONENTS; AND, METHODS

CROSS-REFERENCE TO RELATED APPLICATION

The present application is a continuation of U.S. Ser. No. 13/470,455, filed May 14, 2012. U.S. Ser. No. 13/470,455 is a continuation of U.S. Ser. No. 12/310,468 filed Nov. 6, 2009, and has issued as U.S. Pat. No. 8,177,976. U.S. Ser. No. 12/310,468 is a national stage application of PCT application PCT/US2007/018037, published as WO 2008/030323 on Mar. 13, 2008. PCT application PCT/US2007/018037 claims priority to provisional application 60/842,914, filed Sep. 6, 2006. The complete disclosures of U.S. Ser. No. 13/470,455; U.S. Ser. No. 12/310,468; PCT application PCT/US2007/018037; and U.S. Ser. No. 60/842,914 are incorporated herein by reference.

FIELD OF THE INVENTION

The invention relates generally to liquid filters and methods. The example embodiment described is an in-tank filter assembly, for use, for example, in hydraulic systems.

BACKGROUND OF THE INVENTION

Liquid filters are employed in a variety of applications, including, for example, hydraulic systems, fuel systems and engine lubrication systems.

In general, liquid filters which accommodate downstream components, are of concern. Particularly, it is of concern to prevent cavitation of pumps and other equipment downstream from liquid filters. Conditions such as cold starts, flow surges or occluded elements can result in damaged downstream components.

Certain liquid filter arrangements are described in PCT Publication WO 05/63358, incorporated herein by reference. Variations in such arrangements, are described herein.

SUMMARY OF THE INVENTION

A filter cartridge for use with a liquid filter assembly is provided. The filter cartridge includes: a primary filter cartridge section; a bypass filter cartridge section; a first end cap positioned between the primary filter cartridge section and the bypass filter cartridge section; a seal surrounded by the media of the bypass filter cartridge section; and a second end cap positioned on an opposite end of the primary filter cartridge section from the first end cap. The seal support includes a first inner seal member defining a first inwardly directed seal. The first inwardly directed seal is positioned in a slanted seal plane non-orthogonal to a central axis of the bypass filter cartridge section.

Specific advantageous features for the filter cartridge are shown and described. In addition, a filter assembly configured for advantageous use of the filter cartridge, is also described.

Herein, examples of specific features and combination of features are described and shown. There is no specific requirement that an arrangement include all of the features characterized herein, in order to obtain some advantage according to the present disclosure.

BRIEF DESCRIPTION OF THE DRAWINGS

FIG. 4 is an enlarged, schematic, fragmentary, partially cross-sectional view of a top portion of the assembly depicted in FIG. 1.

FIG. 5 is an enlarged, schematic, fragmentary, partially cross-sectional view of a bottom portion of the assembly depicted in FIG. 1.

FIG. 14 is a schematic perspective view of a subcomponent within the valve sub-assembly of FIG. 13.

FIG. 15 is a schematic side elevational view of the subcomponent of FIG. 14.

FIG. 16 is a schematic cross-sectional view of the component of FIG. 14, taken along line 16-16, FIG. 15.

FIG. 19 is a schematic cross-sectional view taken generally along line 19-19, FIG. 18.

FIG. 20 is a schematic cross-sectional view taken generally along line 20-20, FIG. 19.

FIG. 21 is a schematic, enlarged, cross-sectional view of a further subcomponent of the assembly of FIG. 13.

DETAILED DESCRIPTION

The principles described generally in PCT Publication, WO 05/63358, can be applied in arrangements having alternate specific features, and configured for still further advantages. Herein, in FIGS. 1-21 such an arrangement is depicted that is useable, for example, for application in hydraulic systems with expected flow rates, for example, of up to about 250 liters per minute. Of course the principles could be applied to construct arrangements to allow for alternate flow rates, if desired.

Figure 1:
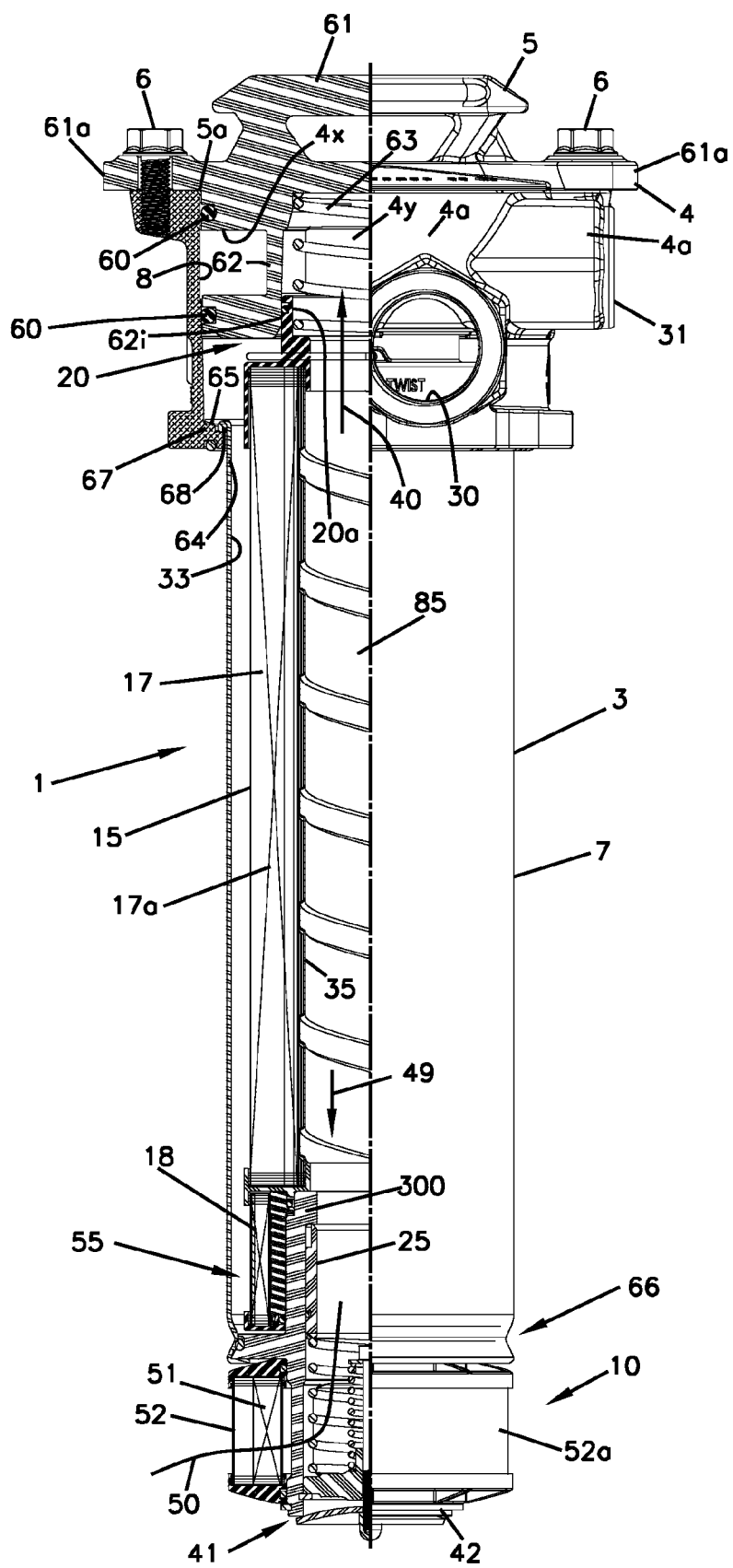
FIG. 1 is a schematic side elevational, partially cross-sectional, view of an assembly according to the present disclosure.

The reference numeral 1, FIG. 1, generally indicates a liquid filter arrangement or assembly according to this aspect of the present disclosure. The liquid filter assembly 1 includes a housing 3 comprising: a filter head 4 having a body 4a and a removable top or cover 5; and, a side wall 7, which in use, extends (depends downwardly) from filter head 4. In general, the housing 3 defines an internal volume 8, in which: selected internal componentry as defined is contained; and, certain filtering and flow operations occur. The liquid filter assembly 1 further includes a suction filter assembly 10.

Herein, "top," "above," and, "below," are meant to refer to the assembly 1, when oriented for normal use, i.e., when in the orientation of FIG. 1. The terms, by themselves, are not otherwise meant to be limiting or to have further definition.

Figure 7:
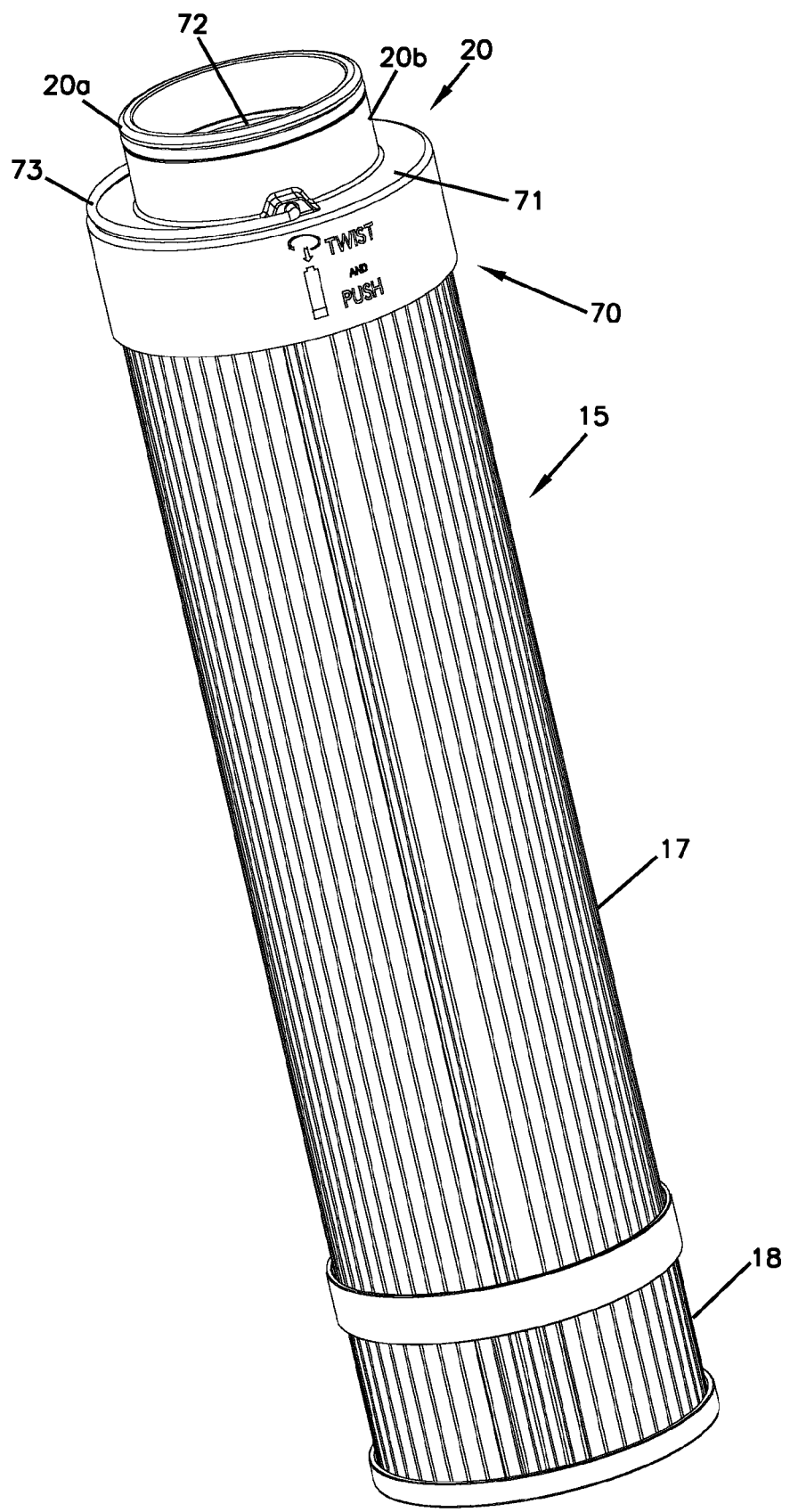
FIG. 7 is a schematic top, perspective, view of a serviceable filter cartridge component of the assembly of FIG. 1.
Figure 8:
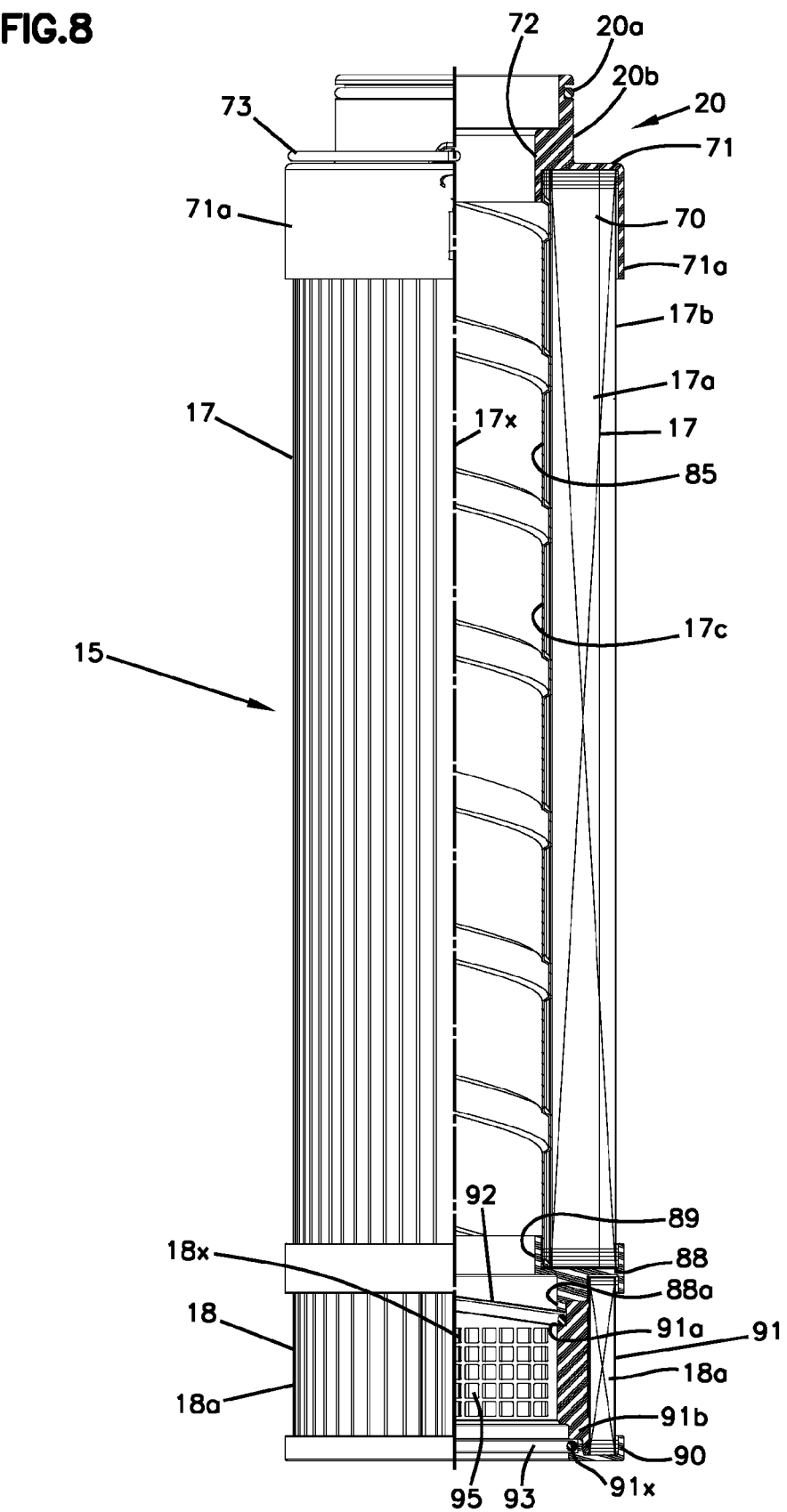
FIG. 8 is a schematic, side elevational, partially cross-sectional, view of the filter cartridge of FIG. 7.

The liquid filter assembly 1 includes, operably positioned therein, a serviceable (i.e., removable and replaceable) filter cartridge arrangement 15, FIGS. 7 and 8. For the particular, preferred, liquid filter arrangement 1 shown, the serviceable filter cartridge 15, FIGS. 7 and 8, optionally includes two filter sections or components namely: a primary (upper) filter cartridge or cartridge section 17; and, a bypass (lower) filter cartridge or cartridge section 18. The primary filter cartridge section 17 and bypass filter cartridge section 18 are typically secured to one another, and are removed and serviced as an integral unit.

Of course, the primary filter cartridge or cartridge section 17 is not required to be non-separably attached to the bypass filter cartridge or cartridge section 18. However, the arrangement depicted, in which the two are typically permanently secured to one another is convenient and typical.

The typical serviceable filter cartridge assembly 15, FIGS. 7 and 8, further includes, as described below, an end cap and seal arrangement 20 (sometimes referred to as the upper or second end cap), which provides for a preferred mounting and sealing of the serviceable filter cartridge arrangement 15 to the filter head 4 within the liquid filter arrangement 1.

Figure 13:
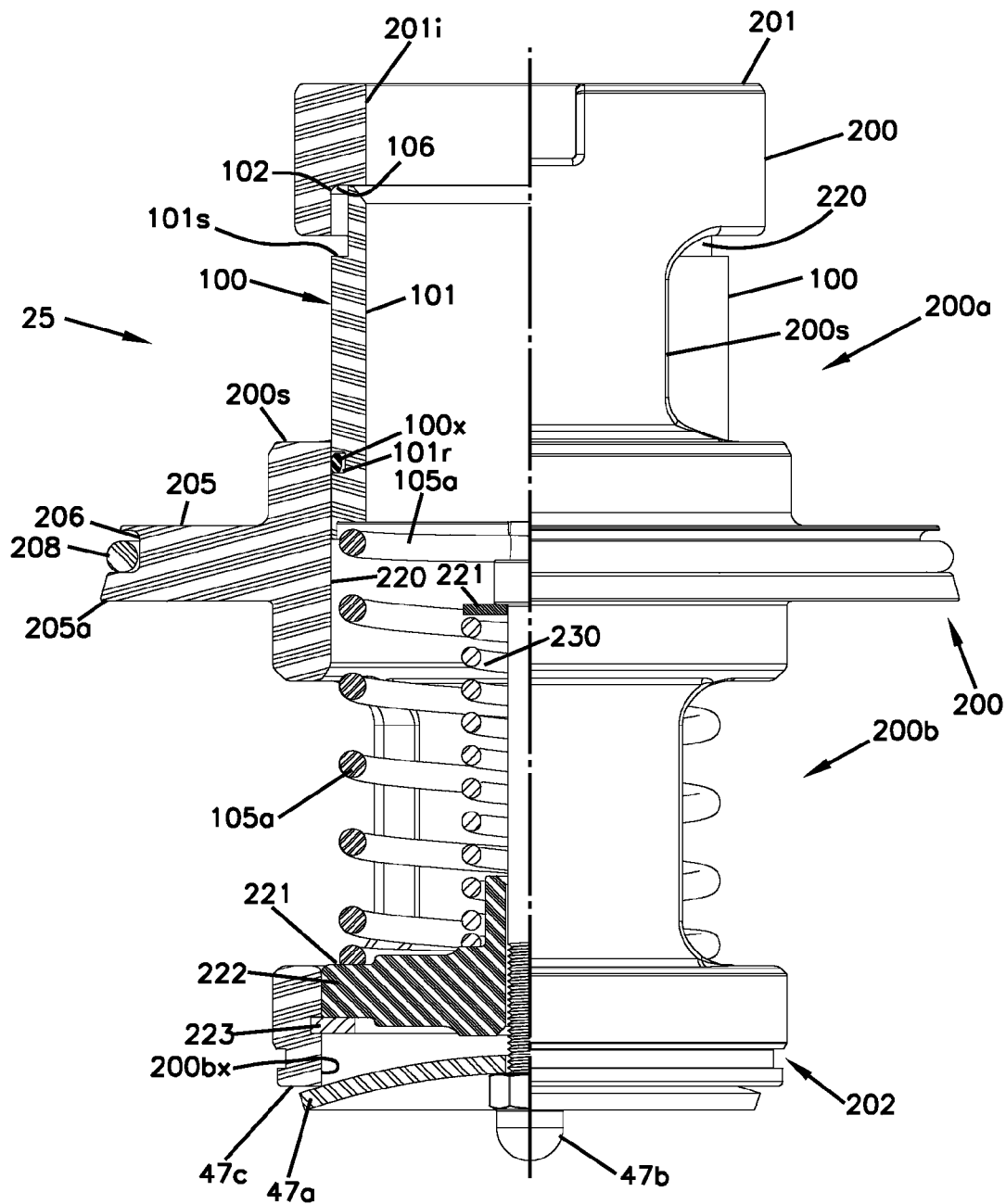
FIG. 13 is a schematic, side elevational, partially cross-sectional, view of the component of FIG. 9 in the valve sub-assembly of FIG. 12.

The preferred liquid filter assembly 1 depicted includes a bypass valve assembly 25, FIGS. 1, 5 and 13.

Referring to FIGS. 1-5, typical operation of the various components defined, will be generally in accord with the following. The filter head 4 generally includes a body 4a having an inlet or inlet arrangement 30 and an outlet or outlet arrangement 31.

The liquid flow inlet arrangement 30 will sometimes be referred to as a circulation loop liquid flow inlet arrangement, since it is an inlet arrangement to the filter head 4 of liquid from a liquid circulation loop in which the liquid filtered by assembly 1 circulates to perform its function. Similarly the outlet arrangement 31 will sometimes be referred to as a circulation loop liquid flow outlet arrangement, since it is an outlet for filtered liquid, from the filter head 4 and thus the assembly 1, for liquid to be directed into a liquid circulation loop to perform its function.

Figure 2:
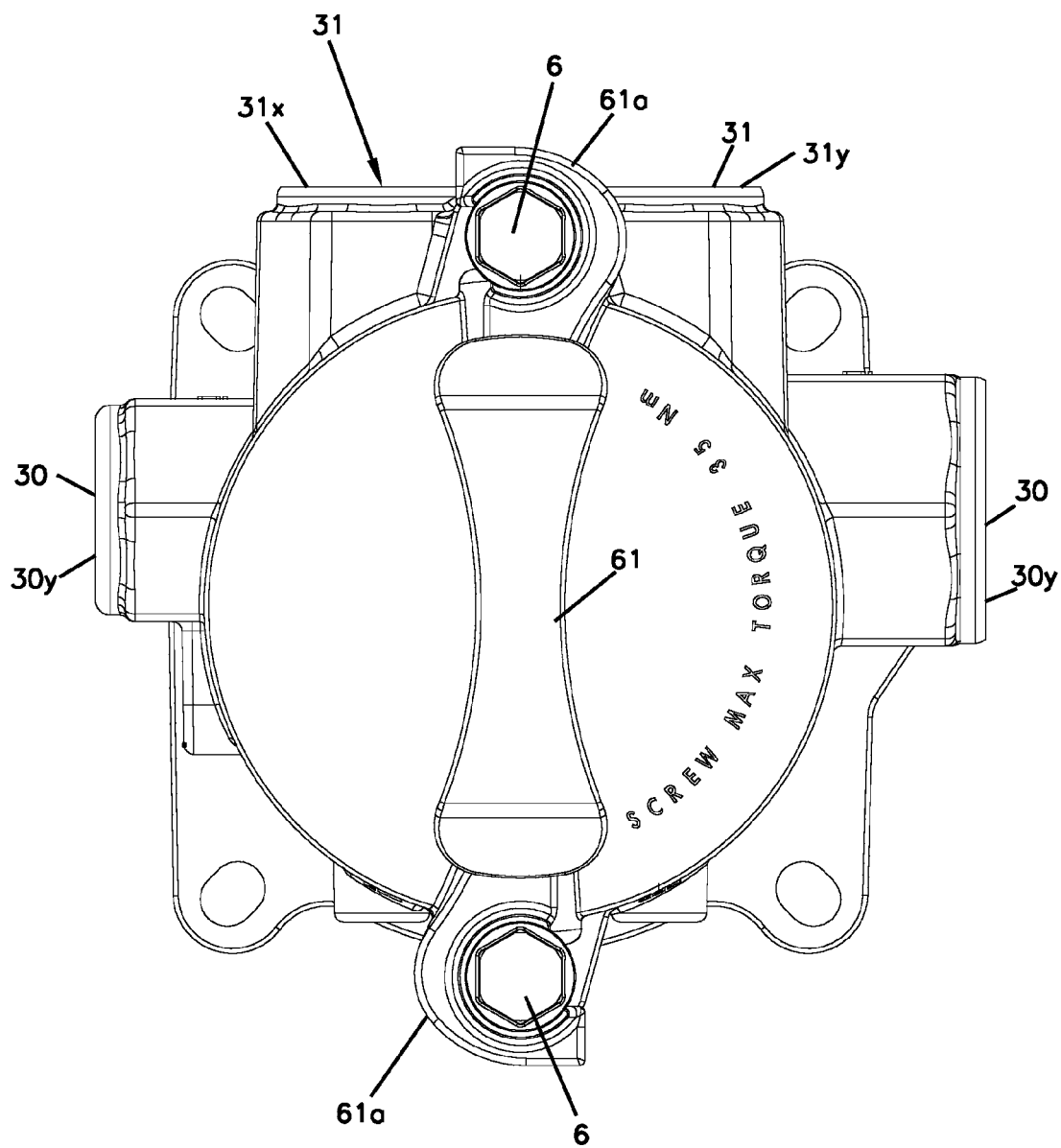
FIG. 2 is a schematic top plan view of the assembly shown in FIG. 1.

Referring to FIG. 2, for the particular assembly 1 shown, the filter head 4 includes, for the inlet arrangement 30, two inlets 30x, 30y; and, for the outlet arrangement 31, two outlets 31x, 31y, although alternatives are possible. This allows assembly 1 to be operated with two circulation loops, for filtered liquid. If the assembly 1 is to be used with only a single circulation loop, an appropriate one of inlets 30x, 30y and an appropriate one of outlets 31x, 31y, can optionally be closed or capped.

Referring to FIG. 1, liquid to be filtered is directed into inlet arrangement 30. The unfiltered liquid then flows into annular unfiltered liquid volume 33, around the serviceable filter cartridge assembly 15. In general, volume 33 is an "unfiltered liquid volume," since the liquid received therein, will generally be received directly from a circulation loop, and will be unfiltered and require filtering.

In normal operation, from the unfiltered liquid volume 33, the liquid is passed through the primary filter cartridge 17 to its interior 35. (This would be a filtering flow.) From the central volume 35 the liquid can pass out of the filter cartridge 15 in a direction of arrow 40 to outlet arrangement 31; and, outwardly from the assembly 1. (This latter flow from volume 35 through outlet arrangement 31 is a non-filtering flow.)

To address the event that liquid flow demands in the circulation loop downstream of the assembly 1, i.e., in the direction of arrow 40, are not sufficiently great to require all filtered liquid entering region 35 to be directed into the circulation loop by passage (after filtering) through outlet arrangement 31, an alternate flow direction is provided. In particular, flow from central volume 35 can be directed outwardly from the housing side wall 3, and eventually outwardly from a bottom of the assembly 1 into a tank reservoir, by passage through bottom, tank or reservoir outlet 42.

Although alternatives are possible, it is noted that assembly 1, FIG. 1, does not include a central standpipe projecting into primary cartridge section 17. A central structure 300 which is present, but typically does not extend into section 17 is discussed below.

Figure 3:
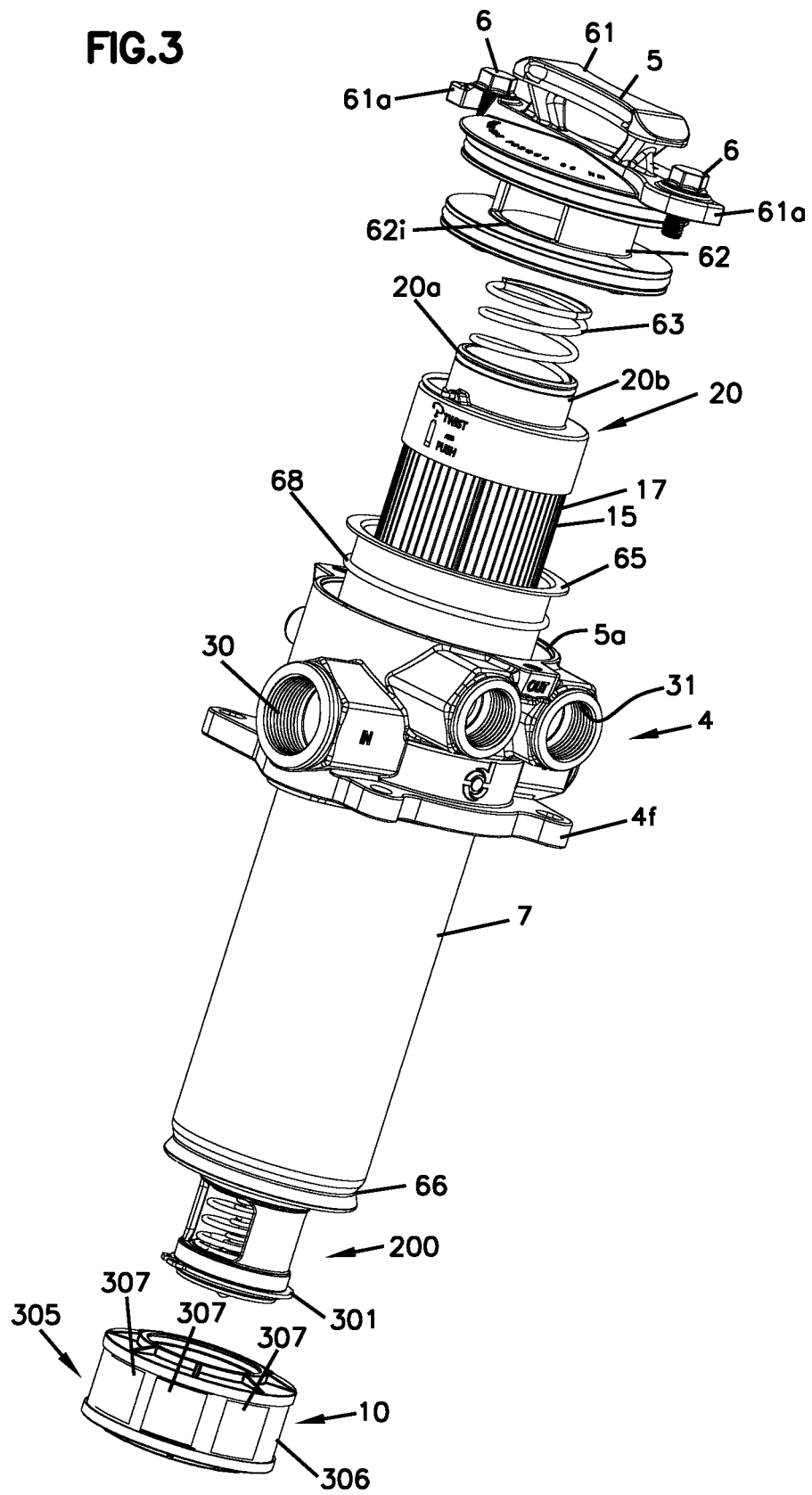
FIG. 3 is a schematic, exploded, perspective view of the assembly depicted in FIG. 1.

In a typical operation, a flow path indicated by arrow 49, from region 35, would be a liquid flow exit from assembly 1 into a tank reservoir; a tank reservoir not shown in FIG. 1. In typical use, although alternatives are possible, the liquid filter assembly 1 would be an in-tank assembly in accord with the principles described in PCT Publication WO 05/63358 and would be mounted on a reservoir tank with suction filter assembly 10 submerged in the tank or tank reservoir. In FIG. 3, a mounting flange for attachment to a tank is shown at 4f.

With the particular liquid filter assembly 1 depicted, FIG. 1, flow/pressure regulation valve arrangement 47 is conveniently positioned below the suction filter assembly 10 to control flow through outlet 42, as described in detail below.

From the above descriptions of general use, it can be expected that in some circumstances, for assembly 1, there can be a flow demand increase downstream of the liquid filter arrangement 1, relative to the liquid volume and flow going into inlet arrangement 30. When this occurs, liquid can be drawn from the tank reservoir in the direction of arrow 50, FIG. 1, through suction filter assembly 10 and eventually into central volume 35. Such a flow will generally be through suction filter 51, in suction filter arrangement 10, and is a filtering flow. A directionally biased flow (valve) arrangement 52, for example as referenced in WO 05/63358, is provided in the suction flow path. The directionally biased flow (valve) arrangement 52 allows for entrance of liquid into region 35, but inhibits liquid flow in an opposite direction, so as not to override or disable a proper bypass operation of flow/pressure regulation valve arrangement 47. The preferred directionally biased flow (valve) arrangement 52 depicted, is a non-helical spring valve arrangement 52a, referenced below. It is noted that for the embodiment depicted in FIG. 1, the non-helical spring valve arrangement 52 surrounds the filter 51, although alternatives are possible.

To protect the equipment in the circulation loop, in circumstances in which the primary filter cartridge section 17 becomes occluded to an undesirable level, a bypass filter arrangement 55, FIG. 1, is provided. The bypass filter arrangement 55 includes bypass filter section 18 and bypass control valve arrangement 25. In general, should the pressure differential across media 17a in primary filter cartridge 17 become sufficiently high, the bypass control valve arrangement 25 is configured to open, to allow liquid flow through bypass filter 18 and into central volume 35, as a filtering flow but without passage through filter media 17a in primary filter cartridge 17. This flow can then proceed, in the direction of arrow 40, FIG. 1, through outlet arrangement 31, or alternatively into the tank reservoir by passage through outlet 42 and from assembly 1.

For a typical liquid filter assembly 1, filter head 4 will be a cast member, for example made from cast aluminum or other material. Cover 5 is secured by bolts 6, FIG. 1, to the filter head 4, to close service aperture 5a, with spaced, radial, seals provided by o-rings 60. The cover 5 includes handle 61 and extensions 61a, for bolts 6. An optional bleed valve assembly 56, FIG. 6, can be provided, as depicted in PCT Publication WO 05/63358.

The cover 5 includes, positioned internally and centrally, a stem 62, configured to project into a central volume 4b of filter head 4. The filter cartridge 15 is sealed to a lower, solid, inside portion 62i of stem 62 by seal 20a on stem 20b, FIG. 4. In particular, stem 20b, on cartridge 15, projects inside of stem 62, on cover 5. The seal, 20a, separates the filter head 4 into an unfiltered region 4x and a filtered region 4y.

In use, spring 63 is positioned inside the stem 62, FIG. 1, to ensure that the serviceable filter cartridge 15 is retained in extension into the housing 3, at an appropriate position and to ensure that the cartridge 15 cannot be moved out of its operational (sealed) position, unless cover 5 is removed.

The sidewall portion 7 of the liquid filter assembly 1 depicted, FIG. 1, is separable from the filter head 4. In particular, the body 4a of filter head 4, FIG. 1, includes an aperture 64 therein positioned on opposite side or direction of the filter head body 4a from the service aperture 5a and cover 5. The sidewall section 7, projects through, and outwardly from (in use downwardly from), the aperture 64.

Figure 17:
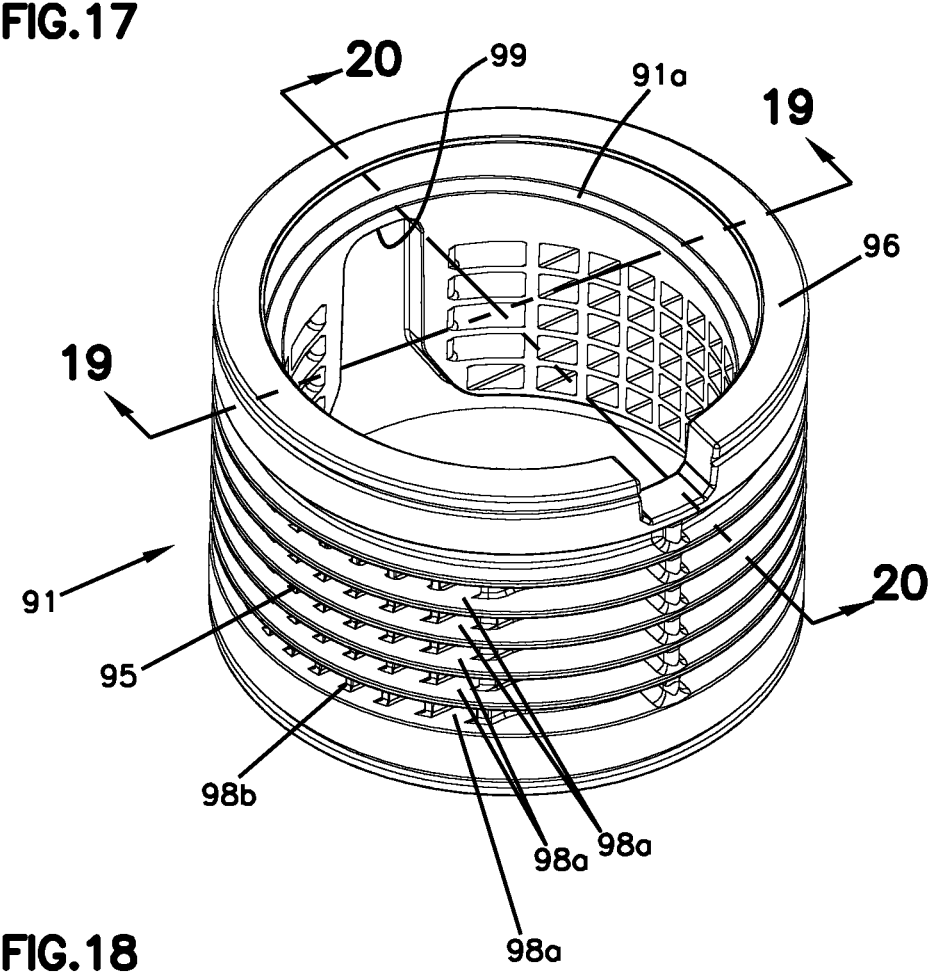
FIG. 17 is an enlarged schematic top perspective view of a sub-component of the filter cartridge depicted in FIGS. 7 and 8.
Figure 18:
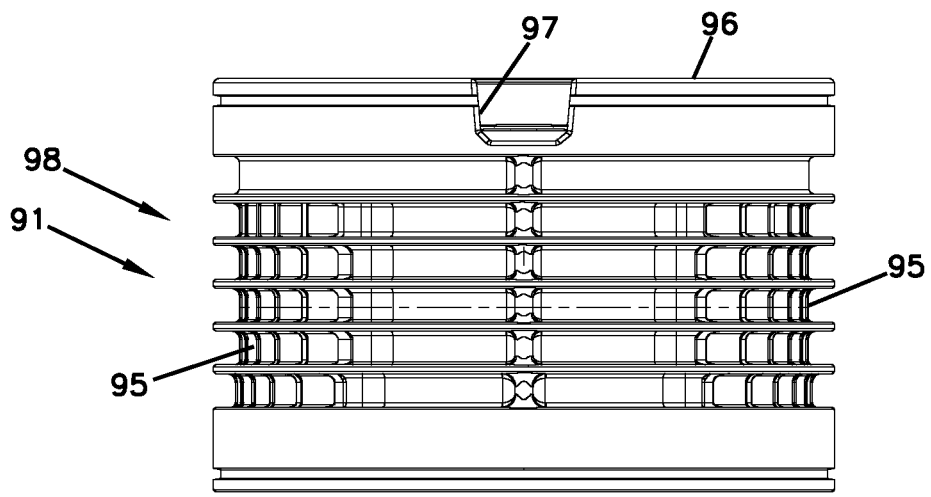
FIG. 18 is a schematic side elevational view of the component depicted in FIG. 17.

The sidewall section 7 can be provided with a wire handle (not shown) which can be rotated down (analogously to sidewall section 607, FIGS. 17 and 18 of PCT Publication WO 05/63358). The sidewall section 7 has shoulder 65 (at an upper end in use) and an opposite (in use bottom) end 66. The side wall 7 is sized such that, during assembly, when the top 5 is removed from body 4a, FIG. 1, the side wall 7 can be lowered into the housing 3 through the opening 5a provided by the absence of the cover 5, until the shoulder 65 engages shoulder 67 in the filter head 4. Shoulder 65, FIG. 1, is provided with a seal member 68, to provide for a seal at this location.

Attention is now directed to the serviceable filter cartridge 15, FIGS. 7 and 8. In general the serviceable filter cartridge 15 includes the second (upper in use) end cap and seal arrangement 20, referenced above. The second end cap and seal arrangement 20, for the particular embodiment depicted, is mounted on an end (in use upper end 70) of the primary filter cartridge 17. The second end cap and seal arrangement 20 includes an end cap portion 71 which, for example, can be a molded member secured (i.e., potted) to the primary filter cartridge 17. The end cap portion 71 includes a central aperture 72, for passage there through of liquid (from region 35) to be directed in the direction of arrow 40 (FIG. 1) to circulation loop outlet arrangement 31. The end cap portion 71 includes axial projection 20b. The axial projection 20b is tubular with an outer surface and projects in an opposite direction, with respect to end cap portion 71, from primary cartridge media 17a. The projection 72a is configured to project into projection 62, FIG. 1, with sealing by a housing seal member such as o-ring 20a, as previously mentioned. The o-ring or seal 20a, then, is mounted on an outside surface of, and surrounds, projection 20b.

A handle arrangement 73 is depicted mounted on end cap portion 71. The handle arrangement is collapsible, see FIG. 7, during installation. The handle 73 can be used, for example, to raise cartridge 15 from its installed position FIG. 1, when cover 5 is removed.

The end cap 71 can be molded from a variety of moldable plastic materials, for example a polyamide (PA). As an example, a glass filled polyamide (15-30% glass filled by wt.) is useable. It can also be formed as a metal piece.

Referring to FIG. 8, it is noted that end cap 20 includes a shield projection 71a thereon. The shield projection 71a projects downwardly along an outside 17b of media 17a in cartridge 17 generally a length of extension far enough to extend to a point at or below a lower most extent of each of inlet arrangement 30 and outlet arrangement 31, FIG. 1. This will inhibit fluid entering inlet arrangement 30 from directly impinging upon the media 17a at this location.

A central support or inner support 85 can be positioned along an inside 17c of the pleated media 17, for support. A perforated metal liner, or expanded metal liner, can be used, for the inner support 85. If a metal-free or reduced metal configuration is desired for the serviceable cartridge 15, a perforated or porous plastic liner can be used. In FIG. 8, a preferred coiled metal strip, perforated or louvered, with an edge coupling is depicted as used for liner 85.

The media 17a can be a pleated media contained within a pleated mesh or similar structure, with pleats extending between the opposite end caps. The mesh may comprise a metal wire mesh or a plastic mesh, as preferred for a selected application.

In a typical application, the axial length of the media 17a of the primary filter media section 17, will be at least 3 times (typically at least 4 times) the axial length of the bypass filter media 18a, although alternatives are possible.

In some assemblies it may be desirable to provide the primary filter cartridge 17 with an upstream outer liner such as a porous metal or plastic liner; or, a liner/valve construction, in accord with the descriptions of PCT Publication WO 04/000436 published Dec. 31, 2003, incorporated herein by reference.

Referring still to FIG. 8, at an end opposite end cap 71, the primary filter section 17 is secured to first end cap 88. End cap 88 is open, having a central aperture 89. Also secured to end cap 88, on an opposite side from primary filter section is bypass filter section or arrangement 18 comprising media 18a secured in extension between end cap 88 and a lower, opposite, third end cap 90.

Still referring to FIG. 8, the primary filter cartridge section 17, and in particular the media 17a, can be characterized as circumscribing a primary filter section central axis 17x; and, the bypass filter section 18, and in particular the media 18a, can be characterized as circumscribing a bypass filter section central axis 18x. For the particular example shown, the axes 17x, 18x are colinear; and, each of the media extensions 17a, 18a, is generally circular in cross-sectional definition. Alternatives from this are possible with the principles as described herein.

Media 18a bypass arrangement 18, is positioned surrounding a seal support 91. The seal support 91 is secured to, and between end cap 88 and end cap 90. Seal support 91 can be secured in place with adhesive. Undercuts 91s, FIG. 20, can be used to receive adhesive and facilitate adhesion in place.

Inner seal 92, in the example shown comprising an o-ring, is depicted positioned on an upwardly directed shelf or shoulder 91a of seal support ring 91 at a location between shoulder 91a and a downwardly, axially, projecting portion 88a on end cap 88. Portion 88a, generally comprises a downwardly projecting inside ring on end cap 88 extending in a direction opposite media pack 17a and primary filter cartridge section 17.

Seal support 91 is provided with a second inner seal 93, in the example shown as an o-ring, at a second, lower, end 91x positioned between shoulder 91b and end cap 90.

For the particular example shown, a projected internal seal size defined by the upper ring 92 is smaller than the projected internal size of the internal seal definition provided by seal 93. That is, if projected into a plane, an inner circle defined by seal member 92 is smaller than the circle defined to by the interior seal 93. As a result, when the cartridge 15 is installed, seal member 93 can be easily slid past a seal surface for seal member 92, to sealingly engage a larger outer diameter surface for sealing. Alternately stated, a region of a structure around which seal 92 extends, has a small lip, then a region of the same structure around which seal 93 extends. This is discussed further below, in connection with FIG. 9.

Located between the seal rings or o-rings 92, 93, is provided perforated portion 95 of media/seal support ring 91.

Seal support ring 91 is depicted in more detail, in FIGS. 17-20. Referring to FIG. 17, a top perspective view of seal support ring 91 is depicted. The seal support ring 91 includes: upper o-ring support shoulder 91a; outer peripheral perforated sidewall region 95; and, internal, lower, downwardly directed, shoulder 91b, FIG. 19. The ring 91 also includes an upper axial end surface 96, positioned to abut a portion of end cap 88, FIG. 8, during assembly. The ring 91 includes an upper gap or slot portion 97, discussed further below.

Still referring to FIG. 17, in sidewall 98, which includes perforated ring 95, is also included a downwardly, axially, directed, locator or key slot 99. There is no specific requirement that the key slot 99 extend completely through sidewall region 95 of ring 91. Indeed for the example shown, key slot 99, which communicates with an inner portion 91i of ring 91, it does not extend through to outer portion 91o, see FIG. 20. The key slot 99, as discussed below, is configured to slidably engage and receive therein a projection on a structural portion of assembly 1, when the filter cartridge 15 is installed. This will be discussed below in connection with elongate locator or key projection 212, FIG. 9.

Still referring to FIG. 17, sidewall 98 comprises a plurality of vertically spaced rings 98a, with perforated portions 95 comprising flow regions therebetween, and between vertical spacers 98b.

Typically, ring member 91 would be a molded plastic component, although alternatives are possible.

In FIG. 18, a side elevational view taken toward downwardly directed upper gap or slot 97 is shown. Referring to FIG. 19, a cross-sectional view taken along line 19-19, FIG. 17, is depicted. Here, key slot 99 is viewable, as well as seal shoulder 91a. In FIG. 20, a cross-sectional view taken along 20-20, FIG. 17, is depicted. Here shoulders 91a, 91b, are readily viewable.

Referring to FIGS. 17, 19 and 20, shoulder 91a is planar and sits in a plane slanted from horizontal, i.e., in a plane extending at an angle x, FIG. 20. The angle x is an acute angle from horizontal, when ring 91 is positioned with surface 96 pointed upwardly and shoulder 91b pointed downwardly. The angle x generally extends at an angle x of at least 4°, typically not more than 30° (typically 4°-20° inclusive), and often within the range of 7°-15°. Thus, o-ring 92, is positioned at an angle corresponding to angle x.

Alternately stated, ring 91 can be said to have a central vertical axis extending thereto, generally corresponding to axis 18x, FIG. 8. The plane of shoulder 91a, is generally non-orthogonal to axis 18x, i.e., does not extend at 90° thereto. Further, the plane of shoulder 91a, generally extends at an acute angle x relative to a plane that would be orthogonal to central axis 18x.

It is also noted, referring to FIGS. 19 and 20, that at a vertically highest (when installed) portion 91ah of shoulder 91a extends over key slot 99; and, at a vertically lowest (when installed) portion 91al, shoulder 91a extends underneath gap 97. Thus, when cartridge 15 is installed, seal member 92 will extend over a key to which key slot 99 engages, and underneath gap 97. The seal member 92 will also extend underneath a gap 213, FIG. 12, in a frame piece 200 to which the seal member 92 seals. This is discussed below.

From the previous descriptions, and a review of FIG. 1, it can be seen that during a servicing operation, cover 5 would be removed, and the serviceable filter cartridge 75, comprising the primary filter cartridge 17 and the bypass filter 18, would be operably installed in place of a removed cartridge. Finally, cover 5 would be positioned in place.

Proper operation of the bypass filter 18, is controlled by the bypass valve assembly 25. Referring to FIG. 5, the bypass valve assembly 25 comprises a valve member 100; in this instance a tubular valve member 101 slidably positioned within seat 102 between biasing member 105 (in this instance spring 105a) and stop 106. Sufficient fluid pressure through ring 91 and against region 107 will cause the bypass valve 25 to open. In this example, the valve member 100 and spring 105a are mounted within internal valve frame piece 200. The valve frame piece 200 includes and defines seat 102.

In more general terms, the valve member 100 of the bypass filter assembly 25, is moveable between two positions: a first, closed, sealed position as depicted in FIG. 5; and, a second, open position. In the first, sealed, closed position, the tubular valve member 101 is biased against seat 102 by the biasing member 105. In the second, opened, orientation, sufficient pressure against the tubular valve member 101, causes the tubular valve member 101 to bias against the biasing member 105, overcoming a closing force of the biasing member 105, to unseat the tubular valve member 101 from the seat 102.

The valve frame piece 200, mounted on housing 3, supports: bypass valve assembly 25; suction filter assembly 10; and, flow/regulation valve assembly 47.

Attention is directed to FIGS. 9-16, with respect to valve frame piece 200 and its use. In general, the valve frame piece 200 is a sub-component of a valve sub-assembly 200x, FIG. 13. The valve sub-assembly 200x supports: the bypass valve assembly 25; the tank outlet flow regulation valve assembly 47; and, provides mounting and sealing engagement for: an installed filter cartridge 15; installation of the valve sub-assembly 200x in the housing 4; and, mounting of the suction filter assembly 10.

Figure 9:
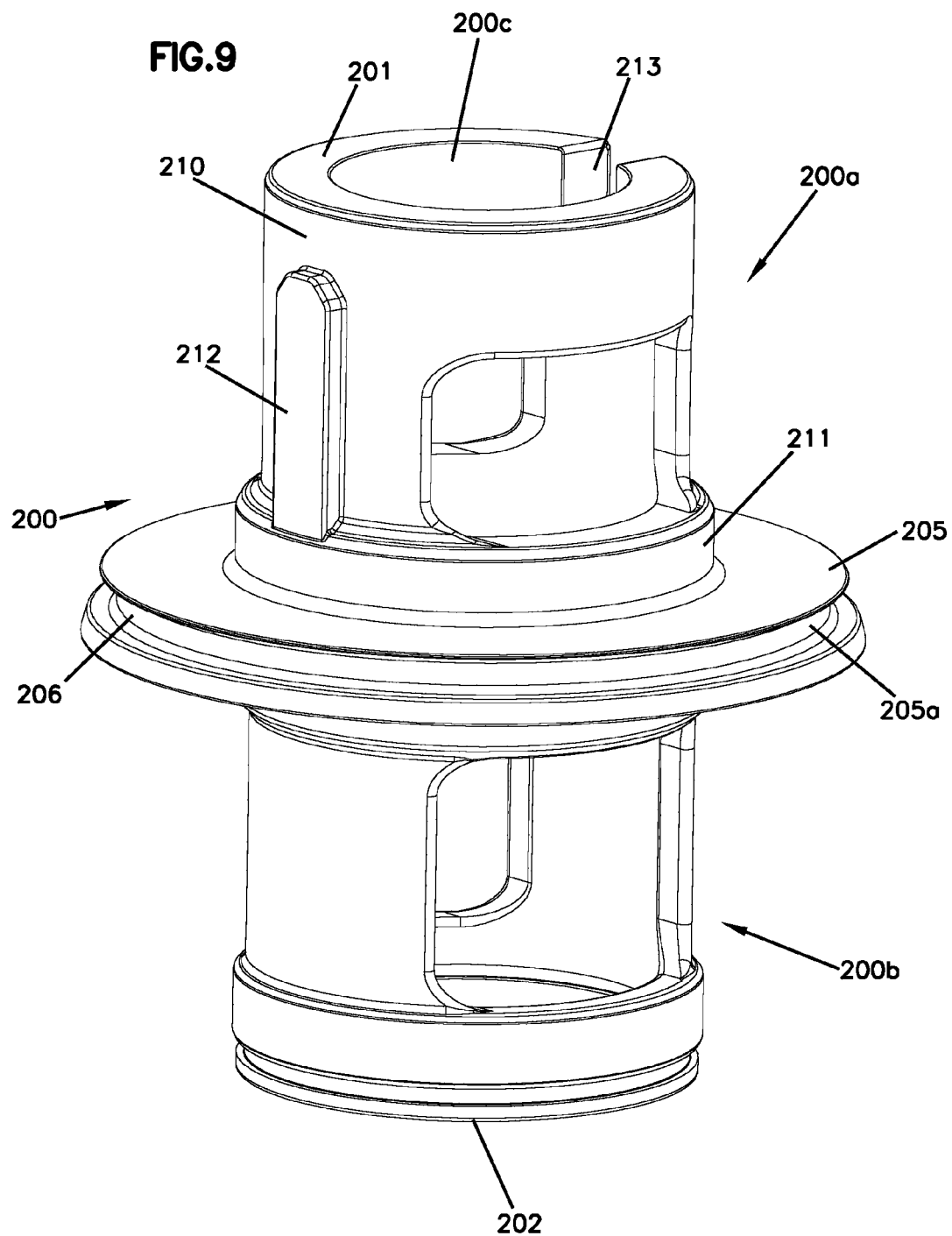
FIG. 9 is a schematic perspective view of a valve frame piece component of the assembly of FIG. 1.
Figure 10:
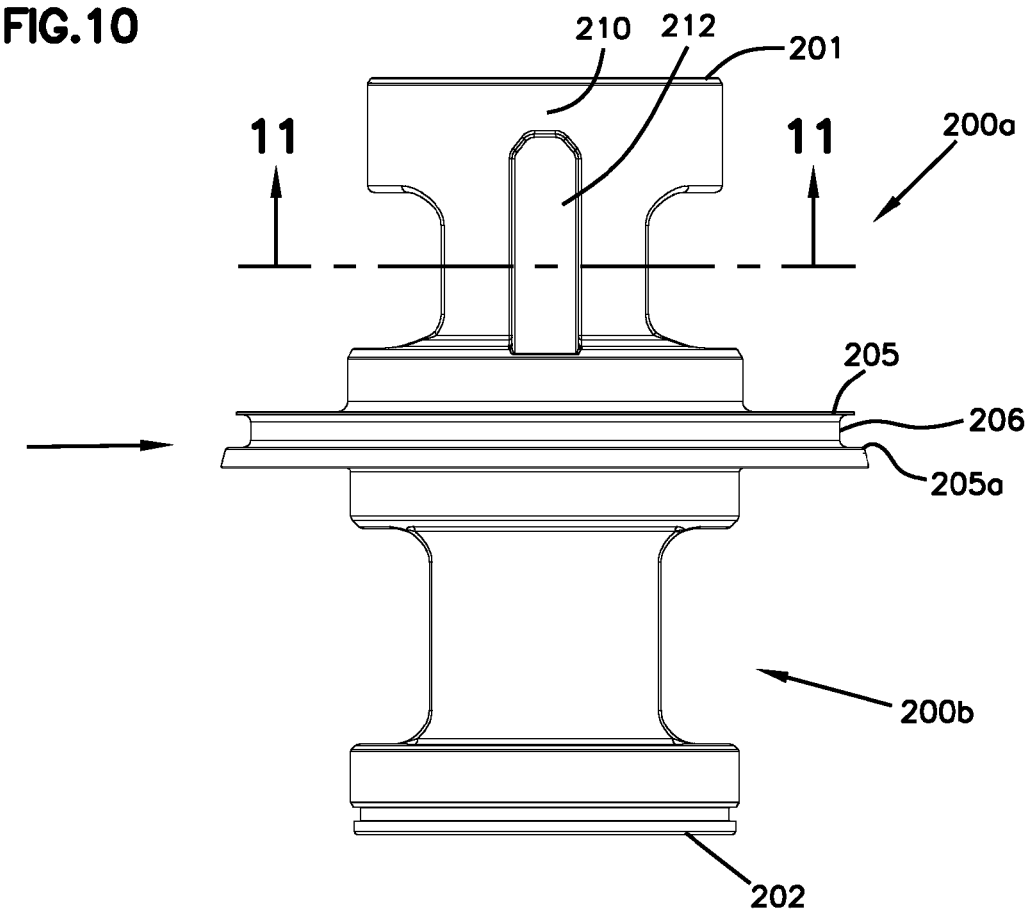
FIG. 10 is a schematic side elevational view of the valve frame piece component of FIG. 9.
Figure 11:
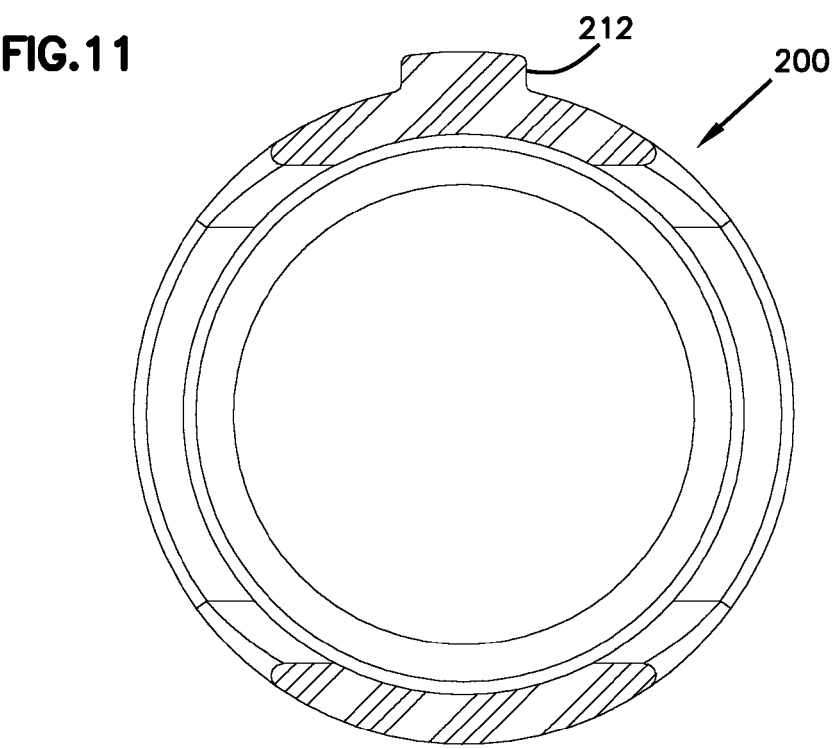
FIG. 11 is a schematic, cross-sectional, view of the valve frame piece component of FIGS. 9 and 10, taken along line 11-11, FIG. 10.
Figure 12:
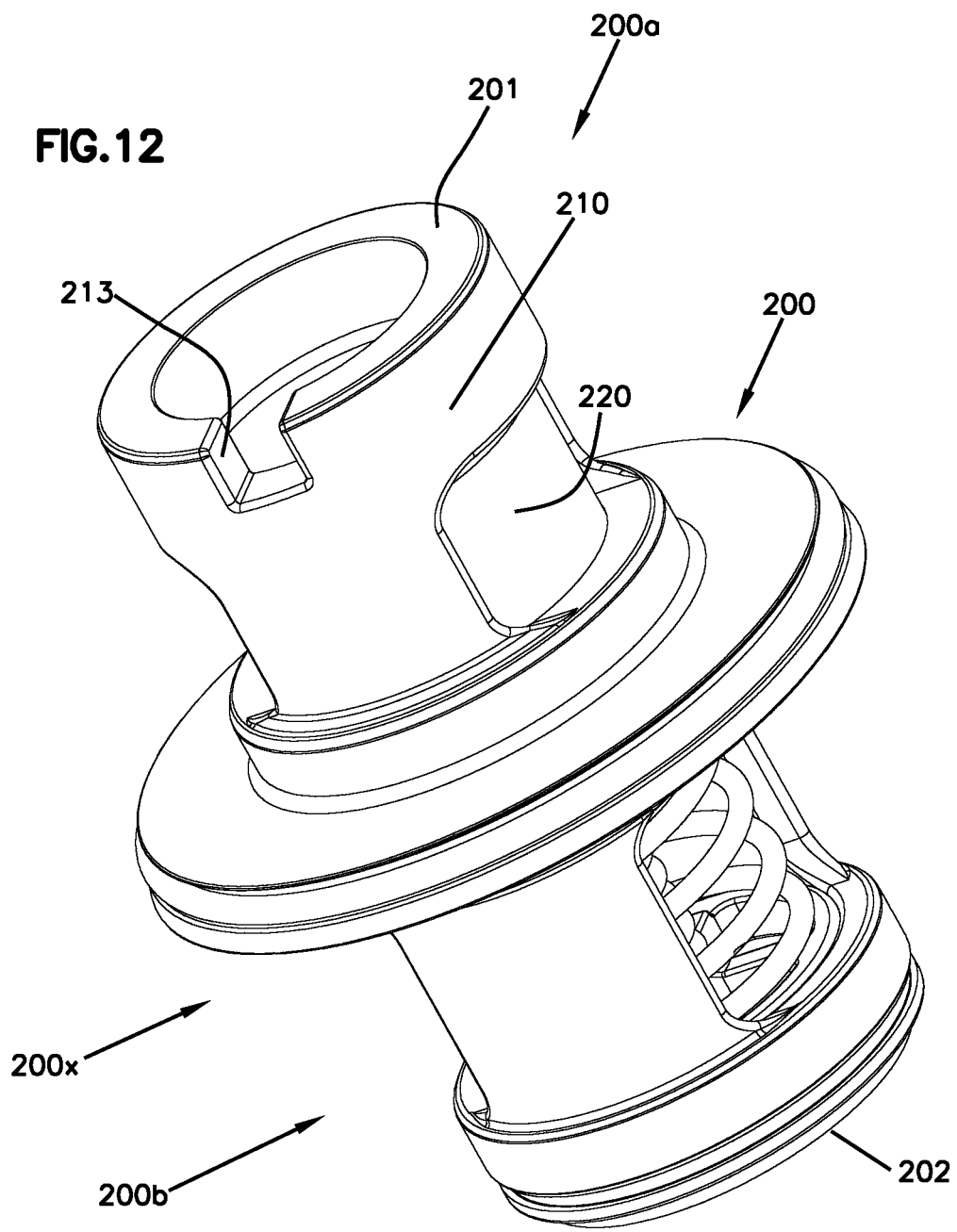
FIG. 12 is a schematic, perspective, view of the valve frame piece component of FIGS. 9-11, with additional subcomponent features therein, to form a valve sub-assembly.

In FIG. 9, valve frame piece 200 is depicted in top perspective view and generally in an orientation similar to that it would have when installed on the housing 3 of the arrangement 1 of FIG. 1. In FIG. 10, piece 200 is depicted in side elevational view. In FIG. 11, a cross-sectional view along line 11-11, FIG. 10 is provided. In FIGS. 12 and 13, frame piece 200 is viewed in the valve sub-assembly 200x, discussed below.

Referring first to FIG. 9, frame piece 200 is tubular with a central conduit 200c extending axially completely therethrough. Frame piece 200 has opposite open (axial) ends, comprising upper end 201 and lower end 202.

Spaced between ends 201 and 202, is provided an outwardly projecting radial ring section 205 defining peripheral seal support member 205a, with an outer annular, peripheral, seal groove 206 therein. When valve frame piece 200 is mounted within sidewall 7, a seal member such as an o-ring 208, FIG. 5, is typically positioned within groove 206, for sealing against lower sidewall section 7x. In a typical construction, end 66 of the sidewall 7 would be pinched around projection 205, as shown, to help secure frame piece 200 in position.

Seal support member 205a generally separates the frame piece 200 into two tubular sections, 200a and 200b, FIG. 9; section 200a corresponding to projection 300, FIG. 1. Referring to FIG. 5, first or upper section 200a generally projects axially into an interior of side wall 7, when frame piece 200 is mounted; and, second or lower section 200b generally projects axially outwardly (downwardly) from side wall 7 when frame piece 200 is mounted.

Referring again to FIG. 9, adjacent first or upper end 201, upper, first, section 200a of valve frame piece 200 defines, upper, outer, seal surface 210 for seal member 92. The seal surface 210 is sized and configured to be received within ring 91, FIG. 5, during use; with sealing between valve frame piece 200 and end cap ring 91 being provided by o-ring 92, FIGS. 5 and 8. Again, sealing is preferably along outside surface 210, although alternate configurations are possible.

Still referring to FIG. 9, upper section 220a of valve frame piece 200 includes lower seal region 211. Lower seal region 211 is configured to seal engage at seal 93, FIG. 5. It is noted that seal region 211 has a slightly larger outer size (diameter), than does seal region 210.

Still referring to FIG. 9, section 200a of frame piece 200 includes, along an outer surface thereof: key or locator projection 212; and, in communication with upper end 201, gap 213. Projection 212 is spaced from end 201 and extends away (downwardly) from region 210 (and end 201) toward central region 205.

Projection 212 is sized in position to be received within key slot 99, when cartridge 15 is pushed over end 201, in particular when ring 91 is pushed over end 200a. Thus, a slanted seal supported by shoulder 91a, and resulting from o-ring 92, will pass above projection 212 and below gap 213, along side wall surface 210 of region 200a, to form the slanted seal engagement between cartridge 15 and frame piece 200.

Projection 212 engages key slot 99, and provides for appropriate radial orientation between the cartridge 15 and the valve frame piece 200, during installation. The cartridge 15 would be rotated with downward pushing, until a proper orientation of engagement between projection 212 and slot 99 occurs, at which time axial insertion (cartridge 15 lowering into a seal orientation) occurs. As a result of the angular orientation of seal member 92, as sealing is initiated, complete 360° engagement does not immediately occur, rather as the cartridge 15 is inserted, an incremental increase in installation pressure resulting from further or greater engagement of seal member 92 with surface 210 occurs. This facilitates installation.

In addition, utilization of the key projection 212 and gap 213; as well as the diagonal or slanted nature of the seal member 92, helps ensure that a proper cartridge 15, for utilization with the assembly 1, is chosen for installation.

Referring to FIGS. 12 and 13, interior volume 220 of internal frame piece 200, is sized for receipt of components of the bypass valve assembly 25 therein to form a portion of valve sub-assembly 200x. In particular and referring to FIG. 13, valve member 101 and biasing member 105a are shown positioned in interior 220. The biasing member or spring 105a is seated at seat 221, FIG. 13, and extends upwardly. The valve member 101 is slidably received between the spring 105 and stop or seat 106.

Referring to FIG. 13, as liquid forces against shoulder 101s of valve member 101, reflected through open side 200s of section 200a increase, eventually valve member 101 and shoulder 106, i.e., against the spring force of spring 105a, opening the valve assembly 25 to liquid flow pass from exterior through into interior region 201i. From here, for example, the liquid flow can be through interior 35, in the direction of arrow 40 to outlet flow arrangement 31 as discussed above.

However under normal operation when bias is not intended, the spring force 105a would be to close the valve assembly 25, to bypass flow therethrough. Referring to FIG. 13, seal 101x within receiver 101r, provides seal engagement between valve member 101 and upper section 200a of frame piece 200, along interior 201i, below openings 200s.

Stop 221 comprises a portion of a spoked frame piece 222, see FIGS. 13-16, secured within interior 220 above snap ring 223, and biased in place, in part, by spring 105a. Referring to FIGS. 14-16, piece 22 includes a central projection member 224 with a vertical channel 226 running therethrough.

Referring to FIG. 13, inner spring 230 is shown extending between snap ring 231 and member 222, in particular in extension around post 225. This also provides for securing of member 222 in place.

Attention is now directed to FIG. 21, in which valve member 101 is depicted in enlarged cross-sectional view. Shoulder 101s, against which pressure is directed for opening on the bypass valve arrangement 25 is readily depicted, as well as receiver 101r, for seal member 101x, FIG. 13. Lower biasing shoulder 101y is viewable, to be engaged by spring 105 during assembly.

Referring again to FIG. 13, flow regulation valve assembly 47 comprises a valve diaphragm 47a secured in place on piece 222, by fastener 47b. The diaphragm 47a can bias open under pressure within interior 200i of frame piece 200, to allow downward flow past diaphragm 47a; the flow being allowed by flow through spaces 235 in frame piece 222, FIG. 14. Referring to FIG. 5, diaphragm 47a is configured to bias against a seat 47c formed at a bottom end of frame piece 200.

Referring to FIG. 1, then, bypass valve aperture arrangement 25, provides for a communicating flow between volume 33 and volume 35. When the pressure differential between regions 33 and 35 exceeds a defined amount, the biasing force of spring 105a is overcome, tubular valve member 101 slides away from seat 102, and bypass valve arrangement 25 is opened so that a bypass flow can go from region 33, FIG. 1, into open region or interior 201i of frame piece 200. From here the liquid can, depending on circumstances, flow to the outlet arrangement 31 or through valve 47 to a tank.

In operation, FIG. 13, flow through end valve 47 is inhibited by disk-shaped diaphragm valve member 47a, until pressure in region 200bx exceeds the control pressure of diaphragm 47a. At this point, the valve member 751 will move to open aperture arrangement 47c to liquid flow therefrom, and into the tank. That is, under the appropriate pressure conditions within region 200bx, liquid flow can go through end 47c to the tank reservoir.

Referring now to FIG. 1, attention is directed to the suction filter assembly 10. Referring to FIG. 3, suction filter assembly 10 is a sub-assembly or component, mountable on valve frame piece 200, in use. Still referring to FIG. 3, snap ring 301 would be removed from frame piece 200, suction filter assembly 10 would be positioned around frame piece 200, and snap ring 301 would reinstalled in place.

The suction filter assembly 10 may be in general accord with the construction of an analogous suction filter assembly described in PCT Publication WO 05/63358, with respect to FIGS. 24-26. In general, the suction filter assembly 10 includes a non-helical spring valve arrangement 305. For the example shown, the non-helical spring valve arrangement 305 comprises a sheet 306 with a plurality of flap valves 307 cut therein; each flap valve 307, for the example shown, having a generally u shape. On a pressure draw from within assembly 1, seeking to draw liquid from the tank reservoir, the flap valves 307 will bias inwardly, allowing the passage of flow. Under pressure within assembly 1, the flap valves 307 will generally bias closed. In general terms, the sheet 306 forms a non-helical spring valve arrangement 52a comprising directionally biased valves or valve arrangement 52. By this, it is meant that the directionally biased valve arrangement 52 opens conveniently to allow flow in one direction (outside to inside) but generally closed, inhibiting flow in the opposite direction (inside to outside). By "non-helical spring" in this context, it is meant that the valve arrangement 50 does not include a helical spring biasing arrangement, for operation of the individual flap valves 307.

In FIG. 5, suction filter 10 is shown in cross-section view, sealed in place with seals 310 to frame piece 200. Surrounded by valve member 301, is a filter member 315, corresponding to filter 51, FIG. 1, which surrounds frame piece 200. Thus, after the liquid is drawn through valve member 301, passage through the filter media 315 (51) on the way into interior 325 of lower section 200b. From there, the liquid can pass up through frame member 200, into region 35, FIG. 1.

Figure 6:
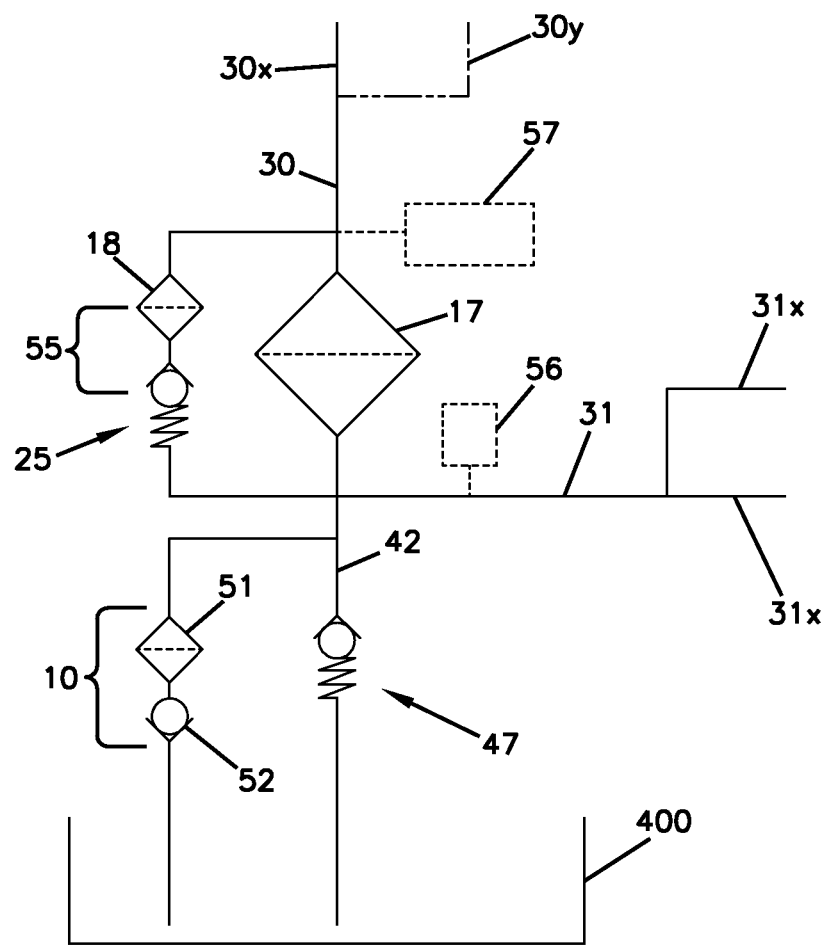
FIG. 6 is a schematic flow chart depicting operation of the assembly of FIG. 1.

In FIG. 6, a schematic view depicting opposite of assembly 1 is provided. Referring to FIG. 6, at 400, a tank arrangement on which assembly 1 would be installed in use, is shown. At 30, an inlet flow path is shown, with optional inlets 30x 30y. At 17, the primary section is shown. After passage through the filter section 17, in ordinary course of liquid is passed through outlet flow arrangement 31 to optional outlet passages 31x 31y. At 56, optional downstream monitoring equipment is shown. Other optional, upstream, monitoring equipment is shown at 57.

In case the primary filter section 17 becomes occluded, a bypass flow arrangement 55 comprising bypass media 18 and bypass valve arrangement 25 is shown.

In the event of demand within the circulation loop being diminished to a point where discharge of liquid into the tank arrangement 400 is needed, a regulation valve arrangement 47 is depicted.

In the event that a draw of liquid in from tank assembly 400 is needed, a suction filter arrangement 10 is depicted, comprising the valve arrangement 52 and media arrangement 51.

In general, the schematic diagram of FIG. 6, is analogous to and operates in accord with, the principles described in PCT Publication WO 05/63358, with respect to FIG. 11.

In more general terms, a filter cartridge is provided. The filter cartridge includes: a primary filter cartridge section, comprising media surrounding a central volume and defining a central axis; a bypass filter cartridge section, including media surrounding a central volume and defining a central axis; a first end cap positioned between the primary filter cartridge section and the bypass filter cartridge section; a seal support surrounded by the media of a bypass filter cartridge section; and, a second end cap positioned on an opposite end of the primary filter cartridge section from the first end cap. The seal support surrounded by the media of the bypass filter cartridge section generally includes a first inner seal member defining a first inwardly directed seal. The first inwardly directed seal is positioned in a slanted seal plate not orthogonal to the central axis of the bypass filter cartridge section.

It is noted that for a typical arrangement, the second end cap comprising a open end cap and includes a tubular axial projection having a radially outer surface and a housing seal member positioned around the radially outer surface of the tubular extension of the second end cap.

In an embodiment shown, the first inner seal member of the seal support defines the inwardly directed seal and slanted seal plane extending at an acute angle x within the range of 4° to 20° inclusive, with respect to a plane orthogonal to the central axis that bypass filter cartridge section.

Typically, the seal support which is surrounded by the bypass filter cartridge section includes a second inner seal member thereon spaced axially from the first seal member and defining a second inwardly directed seal; the second inwardly directed seal typically being oriented in a seal plane orthogonal to the central axis of the bypass filter cartridge. When such is the case, the first inner seal member on the seal support is typically positioned between the second inner seal member and the primary filter cartridge section.

For an example shown, the seal support includes an outer side wall perforate in selected locations that are between the first seal member and the second seal member.

In an example shown, the second inner seal member in the seal support defines a larger inside seal size than the does the first inner seal member of the seal support; inside seal size in this context referring to the ejected inner radial size of the seal member.

For an example shown, the seal support include a side wall section with a locator or key slot thereon; the locator or key slot being positioned spaced from the first seal member in a direction opposite the primary filter cartridge section and extending in a direction away from the primary filter cartridge section.

Also, in an example shown, the seal support includes a side wall section defining a first opening or gap therethrough. The first opening is positioned spaced from the first seal member and positioned between the first seal member and the primary filter cartridge.

For an example shown, the first opening in the seal support side wall is in communication with the first axial surface of the seal support, the first axial surface of the seal support being a surface directed away from the first seal member and toward the primary filter cartridge section.

For the specific example shown: the seal support includes an inner shoulder directed toward the primary filter cartridge; the first end cap includes an axial projection directed toward the inner shoulder of the seal support; and, the first inner seal member is positioned on the inner shoulder of the seal support between the inner shoulder and the axial projection of the first end cap. Typically the first seal member is an o-ring and the second seal member is an o-ring. Also typically the housing seal member positioned around the tubular extension of the second end cap is an o-ring.

Although alternatives are possible, the media of the primary filter cartridge section can comprise pleated media, with pleat direction extending between the first end cap and the second end cap.

Also according to the present disclosure a liquid filter assembly is provided which includes a housing defining an interior and having a filter edge section with a liquid flow inlet arrangement and a liquid flow outlet arrangement. The housing includes a depending side wall section extending downwardly from the filter head section and having a lower end removed from the filter head section. A valve sub-assembly including a frame piece having an upper section, a lower section, and a central seal support flange between the upper and lower sections, is provided in the liquid filter assembly. The frame piece is secured to the depending side wall section of the housing with the central seal support flange sealed to the lower end of the depending side wall with a seal therebetween; the upper section of the frame projection extending upwardly into a volume surrounded by the depending side wall section; and, the lower section of the frame projection extending downwardly from the depending wall section.

A tubular bypass valve member is positioned surrounded by the upper section of the frame piece. The upper section of the frame piece includes an outer wall with a flow opening arrangement therein; the upper section of the frame piece includes an axial open flow end; and, the tubular bypass member is biased by a biasing (spring) member into a closed position. When in the closed position, the tubular bypass member closes an upper section of the valve sub-assembly to flow therethrough from region exterior to the upper section of the frame piece to the axial open flow end of the upper section of the frame piece. However, under an appropriate liquid pressure, the tubular bypass valve member can bias against the spring member sufficiently to an open position wherein the tubular bypass member opens the upper section of the frame piece of the valve sub-assembly to flow therethrough from a region exterior to the upper section of the frame piece, to an axial open flow end of the upper section of the frame piece.

In a typical such assembly, the lower section of the frame piece of the valve sub-assembly includes an open axial end remote from the central seal support flange and the side wall having flow openings therethrough. A flow valve (diaphragm) member is positioned over the open axial end of the lower section of the frame piece of the valve sub-assembly. Also a suction filter assembly is secured to the liquid filter assembly around the lower section of the frame piece of the valve sub-assembly.

A filter cartridge in accord with the above characterizations is positioned within the housing with the housing seal member on the second end cap sealed to the housing in a manner separating the filter head section at the inlet and outlet flow regions; and, the first inner (slanted) seal member of the seal support sealed to and around the upper section of the frame piece of the valve sub-assembly.

What is claimed is:

1. A liquid filter cartridge comprising:
   (a) a primary filter cartridge section comprising media surrounding a central volume and defining a central axis;
      (i) the media defining first and second ends;
   (b) a first end cap positioned at the first end of the media;
      (i) the first end cap including a seal support thereon;
      (ii) the seal support including a first inner seal member positioned thereon to define a first, inwardly directed, radial seal; the first, inwardly directed, radial seal being positioned to define a seal non-orthogonal to the central axis of the primary filter cartridge section; and,
   (c) a second end cap at the second end of the media;
      (i) the second end cap having a central aperture therethrough.

2. A liquid filter cartridge to claim 1 including:
   (a) a bypass filter section having bypass filter media surrounding a central volume;
      (i) the seal support on the second end cap being surrounded by the bypass filter media.

3. A liquid filter cartridge according to claim 1 wherein:
   (a) the first end cap includes a second seal member thereon.

4. A liquid filter cartridge according to claim 3 wherein:
   (a) the second seal member is radially outwardly directed seal member positioned around a seal support on the first end cap.

5. A liquid filter cartridge according to claim 1 wherein:
   (a) the first inner seal member defines a seal plane non-orthogonal to the central axis.

6. A liquid filter cartridge according to claim 5 including:
   (a) a bypass filter section having bypass filter media surrounding a central volume;
      (i) the seal support on the second end cap being surrounded by the bypass filter media.

7. A liquid filter cartridge according to claim 1 wherein:
   (a) the seal support includes a sidewall section with a first key slot thereon;
      (i) the first key slot being spaced from the first seal member in a direction opposite the primary filter cartridge section and extending in a direction away from the primary filter cartridge section.

8. A liquid filter cartridge according to claim 1 wherein:
   (a) the seal support includes a sidewall section defining a first opening therethrough; the first opening being positioned spaced from the first seal member and being positioned between a portion of the first seal member and the primary filter cartridge section.

9. A liquid filter cartridge according to claim 8 wherein:
   (a) the first opening in the seal support sidewall section is in communication with a first axial surface of the seal support;
      (i) the first axial surface of the seal support being a surface directed away from the first seal member and toward the primary filter cartridge section.

10. A liquid filter cartridge according to claim 1 wherein:
    (a) the seal support includes an inner shoulder directed toward the primary filter cartridge;
    (b) the first end cap includes an axial projection directed toward the inner shoulder of the seal support; and,
    (c) the first inner seal member is positioned on the inner shoulder of the seal support between the inner shoulder and the axial projection of the first end cap.

11. A liquid filter cartridge comprising:
    (a) a primary filter cartridge section comprising media surrounding a central volume and defining a central axis;
       (i) the media defining first and second ends;
    (b) a first end cap positioned at the first end of the media;
       (i) the first end cap including a seal support thereon;
       (ii) the seal support including a first inner seal member positioned thereon to define a first, inwardly directed, radial seal; and,
       (iii) the seal support including; a key slot thereon; the key slot being spaced from the first seal member in a direction opposite the primary filter cartridge section and extending in a direction away from the primary filter cartridge section; the slot opening in a direction opposite the primary filter cartridge section and having a central axis about parallel to the primary filter cartridge central axis; and
(c) a second end cap at the second end of the media;
  (i) the second end cap having a central aperture therethrough.

12. A liquid filter assembly comprising:
(a) a housing including a filter head section and a depending sidewall section;
  (i) the filter head section including a removable top; and, a liquid flow inlet;
  (ii) the sidewall section depending downwardly from the filter head section to a housing bottom having a central flow aperture therethrough;
(b) a central tubular support positioned on the housing bottom and including a tubular section projecting toward the filter head section; and,
(c) a liquid filter cartridge comprising:
  (i) a primary filter cartridge section comprising media surrounding a central volume and defining a central axis;
    (A) the media defining first and second ends;
  (ii) a first end cap positioned at the first end of the media;
    (A) the first end cap including a seal support thereon;
    (B) the seal support including a first inner seal member positioned thereon to define a first, inwardly directed, radial seal; and,
    (C) the seal support including; a key slot thereon; the key slot being spaced from the first seal member in a direction opposite the primary filter cartridge section and extending in a direction away from the primary filter cartridge section; the slot opening in a direction opposite the primary filter cartridge section and having a central axis about parallel to the primary filter cartridge central axis; and
  (iii) a second end cap at the second end of the media;
    (A) the second end cap having a central aperture therethrough;
    (iv) the liquid filter cartridge being positioned with the radial seal releasably sealed around the central tubular support.

13. A liquid filter assembly according to claim 12 wherein:
(a) the first inner seal member defines a seal plane non-orthogonal to the central axis.

14. A liquid filter assembly comprising:
(a) a housing including a filter head section and a depending sidewall section;
  (i) the filter head section including a removable top; and, a liquid flow inlet;
  (ii) the sidewall section depending downwardly from the filter head section to a housing bottom having a central flow aperture therethrough;
(b) a central tubular support positioned on the housing bottom and including a tubular section projecting toward the filter head section; and,
(c) a liquid filter cartridge comprising:
  (i) a primary filter cartridge section comprising media surrounding a central volume and defining a central axis;
    (A) the media defining first and second ends;
  (ii) a first end cap positioned at the first end of the media;
    (A) the first end cap including a seal support thereon;
    (B) the seal support including a first inner seal member positioned thereon to define a first, inwardly directed, radial seal; the first, inwardly directed, radial seal being positioned to define a seal non-orthogonal to the central axis of the primary filter cartridge section; and,
  (iii) a second end cap at the second end of the media;
    (A) the second end cap having a central aperture therethrough;
    (iv) the liquid filter cartridge being positioned with the radial seal releasably sealed around the central tubular support.

15. A liquid filter assembly according to claim 14 wherein:
(a) the first inner seal member defines a seal plane non-orthogonal to the central axis.

* * * * *